Nov. 4, 1969  C. ESTVAN, JR  3,475,845
DYNAMIC DISPLAY APPARATUS
Filed Sept. 27, 1967  3 Sheets-Sheet 1
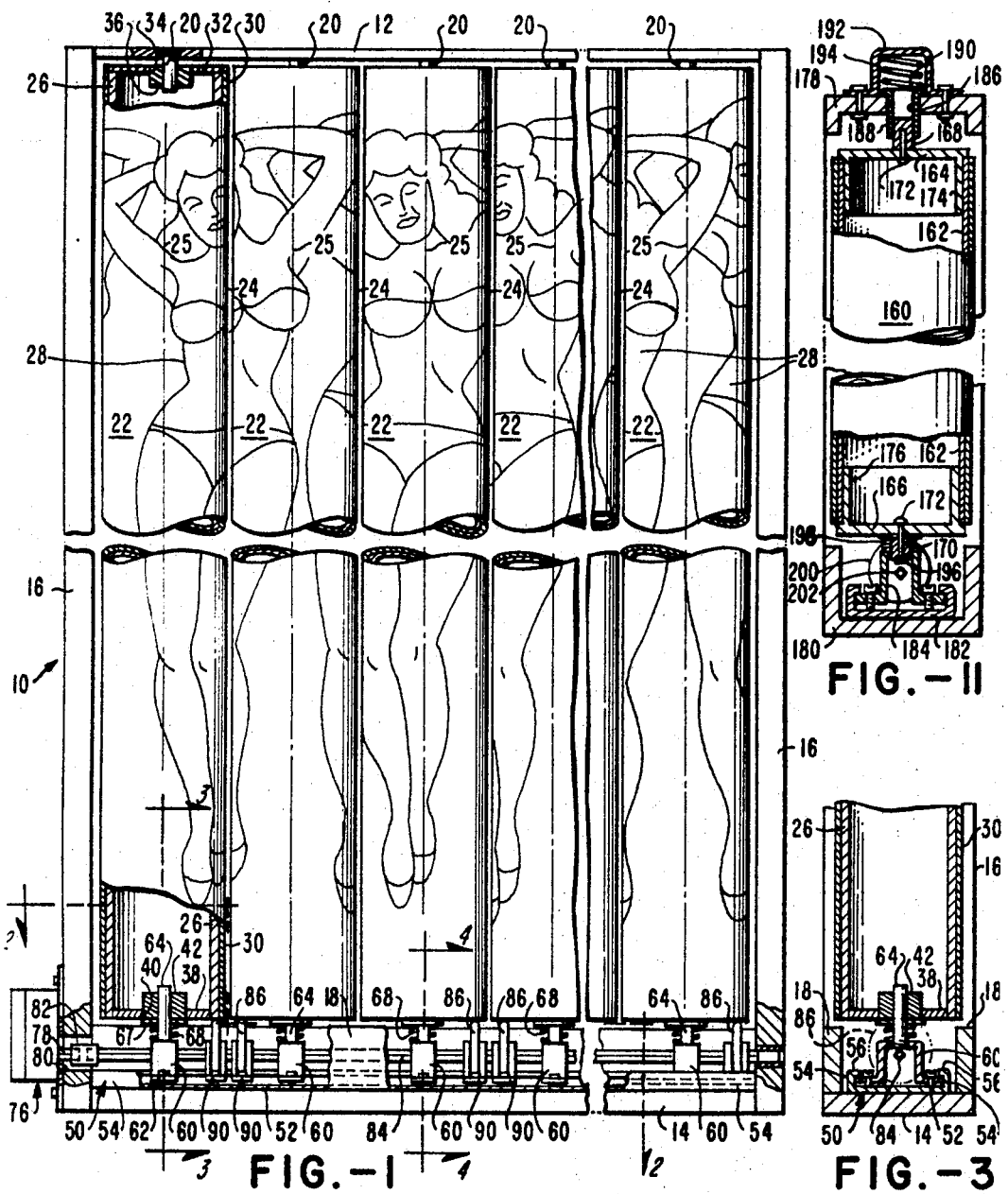
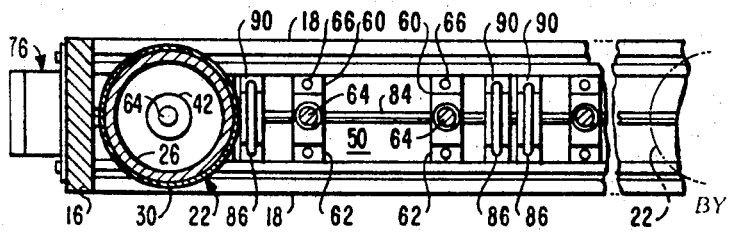
INVENTOR.
CHARLES ESTVAN, JR.
BY *Fraser & Bogucki*
ATTORNEYS

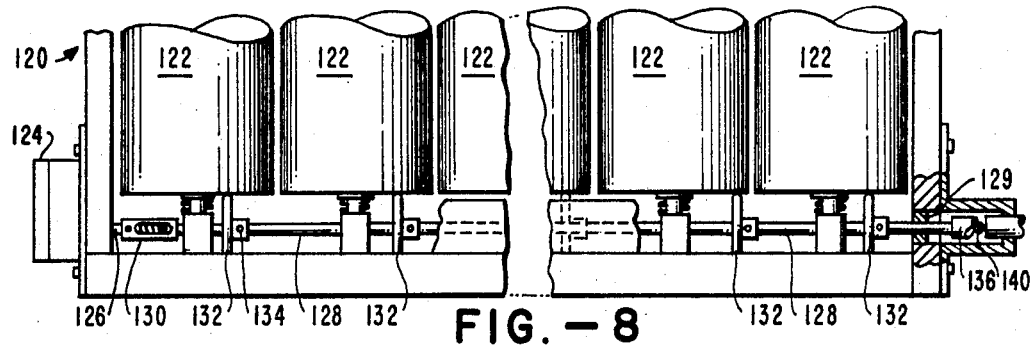
FIG.-8
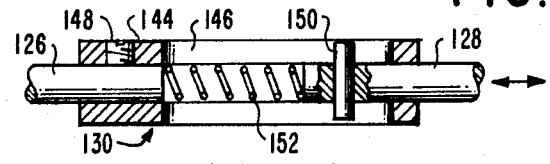
FIG.-10
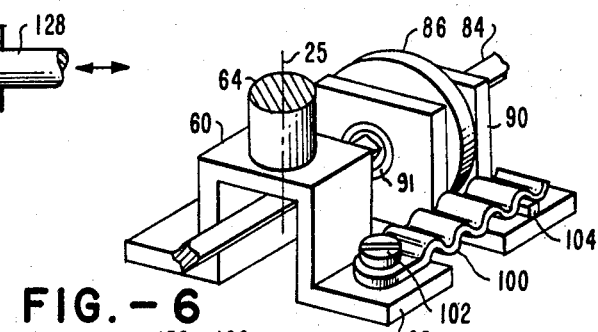
FIG.-6
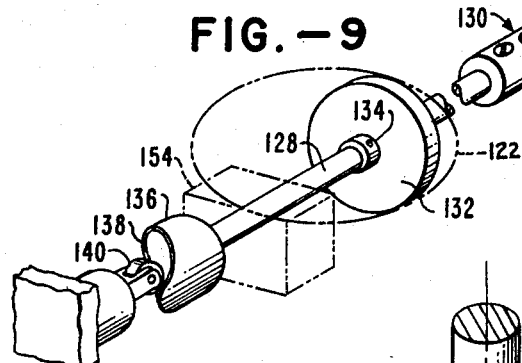
FIG.-9
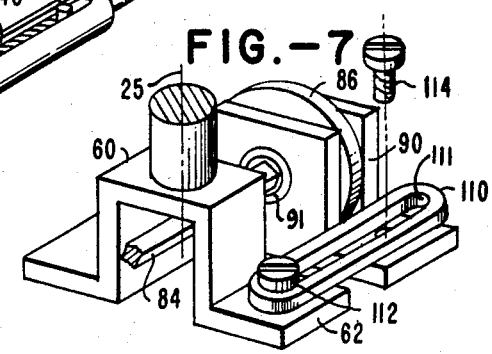
FIG.-7
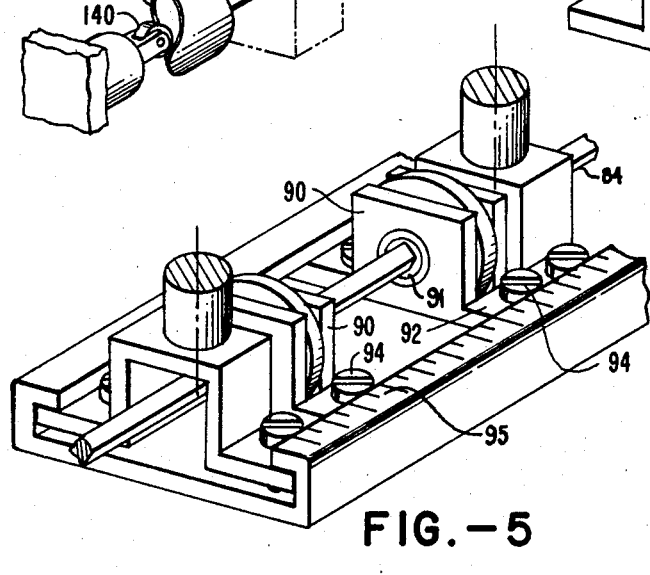
FIG.-5
FIG.-4
INVENTOR.
CHARLES ESTVAN, JR.
BY FRASER & BOGUCKI
ATTORNEYS United States Patent Office 3,475,845
Patented Nov. 4, 1969

3,475,845
DYNAMIC DISPLAY APPARATUS
Charles Estvan, Jr., 5615 Valley Oak Drive,
Hollywood, Calif. 90028
Filed Sept. 27, 1967, Ser. No. 670,903
Int. Cl. G09f 19/02
U.S. Cl. 40—106.51                          15 Claims

ABSTRACT OF THE DISCLOSURE

An apparatus, which may be used, for example, as a movable outdoor advertising display comprising a plurality of parallel cylinders, rotatably mounted side by side, each cylinder having an outer surface bearing a pattern, form, illustration or the like. Each cylinder is frictionally driven by a wheel in engagement with one of the end surfaces of the cylinder. The position of each wheel is adjustable, relative to the axis of rotation of the corresponding cylinder, to permit the rotational speed and/or direction of rotation of the cylinder to be varied either manually, or automatically in accordance with a predetermined program.

Background of the invention

This invention relates generally to movable display apparatus for providing continuously varying forms or patterns having a repetition cycle which may be extended over a long period of time.

Various display apparatus are known in which a plurality of forms or messages are made to appear in succession. One such apparatus in common use today in advertising employs a plurality of parallel, triangular bars which are rotated step by step in synchronization in the same direction to bring the faces of the bars into successive, coplanar relation. Three distinct presentations are thereby brought into view, each remaining visible for a short duration. Although a display such as this may initially attract attention, the repetition becomes quickly apparent to the observer and therefore fails to hold his attention for an appreciable length of time. Besides tending to be monotonous, these displays utilize step-by-step driving mechanisms which tend to be complex, wear out rapidly and are prone to malfunction.

Another display apparatus of the prior art, exemplified by U.S. Patent No. 1,374,921, issued Apr. 19, 1921, uses a series of vertically oriented, rotatable cylinders arranged to be synchronously driven by a worm transmission at the same speed in the same direction to give the illusion of motion such as that of a waving flag. Here again, there is a high frequency of repetition, and variations in the presentation are not possible on account of the drive employed.

Summary of the invention

To achieve the overall object of creating a dynamic medium which is not monotonously repetitious, and which may therefore form the basis for a unique advertisting display or fine arts exhibit, the present invention contemplates a mechanism for rotating a series of vertically oriented, parallel cylinders, each provided with a surface bearing a pattern, form, illustration, or a fragmentary portion thereof. The cylinders are turned at different velocities and, if desired, in different directions, relative to one another. With even a relatively small number of cylinders, the differential peripheral or surface velocities of the cylinders provide a continuously changing picture or display which repeats, if at all, only over a long period of time. The present invention may provide virtually endless combinations of instantaneous relative cylinder positions to produce continuously variable patterns which not only attract but also arrest the observer's attention. The invention is therefore particularly useful as the basis for advertising displays and fine arts exhibits, although other uses will be readily apparent.

Different pattern variations can be produced by providing an adjustable speed control for each cylinder so that it may be individually preset. As a further alternative, adjustment of speed may be accomplished automatically during operation to achieve the greatest continuous variation in pattern and form combinations. In this way, not only does the speed of each cylinder continuously change, but its velocity relative to the other cylinders is also continuously altered.

According to the broad structural aspects of the present invention, each cylinder is driven by a small wheel in frictional contact with one of the planar end surfaces of the cylinder. The radial distance separating the rotational axis of the cylinder and the point of contact of the drive wheel determines the speed of rotation of the particular cylinder, and the direction of cylinder rotation depends upon which side of the cylinder axis the drive wheel is disposed. In addition, the use of a frictional or nonpositive drive permits the manual rotational displacement of particular cylinders to provide any desired initial relative cylinder positions.

In accordance with one specific example of the present invention, the drive wheels are slidably keyed to a line shaft running underneath the cylinders and driven at a substantially uniform speed by an electric motor. The cylinders, rotatably mounted within a suitable frame, are gravity-biased into frictional engagement with their respective drive wheels. Each wheel is disposed within a bracket movable along the axis of the line shaft and provided with means for presetting the distance between the cylinder axis of rotation and the cylinder-drive wheel contact point and hence the rotational speed of the cylinder. In addition, each bracket may be placed on either side of the cylinder axis of rotation to predetermine the direction of cylinder rotation.

The surface of each cylinder may be overlayed with an outer covering material, such as canvas, a metal sleeve or the like, affixed to the surface by a suitable adhesive and water-proofed, if necessary, for outdoor use. A pattern or representation is applied, as by painting, on the cover material. Although an individual cylinder painting will be different from the others, the forms, patterns or shapes appearing on the cylinders normally will be compatible in color and/or in pattern to the extent that they will form part of a unitary, overall theme. As an elementary example, with each cylinder provided with a circle on the surface and by properly phasing the motion of the cylinders and controlling their velocities, the illusion may be created of the circle oscillating from one side of the display to the other or appearing at one extremity of the display and accelerating to the other side.

Cylinder speeds may be varied automatically and continuously, according to another feature of the present invention, by securely mounting the friction drive wheels on the line shaft and providing the end of the shaft with cam means having a contoured surface riding on contact with a roller carried by the frame. As it rotates, the line shaft is thereby made to oscillate axially in a predetermined fashion to continuously vary the drive wheel contact point distances and hence the individual cylinder speeds.

According to another aspect of the invention, a cylinder spindle mounting means is utilized making possible the removal and replacement of individual cylinders without disturbance of the drive mechanism.

Other and more specific objects of the invention, including both constructional details and the operation of the apparatus embodying the invention, will be set forth more fully in, and become apparent from, a reading of

Brief description of the drawings

A better understanding of the invention may be had by reference to the "Detailed description" appearing below, taken in conjunction with the accompanying drawings, in which:

FIG. 1 is a fragmentary, front elevation view, partially in section, of an apparatus according to the present invention;

FIG. 2 is a fragmentary, top sectional view of the apparatus of FIG. 1 taken along the plane 2—2;

FIG. 3 is a side sectional elevation view of a portion of the apparatus of FIG. 1 taken along the plane 3—3;

FIG. 4 is a side elevation view, somewhat enlarged, of a portion of the apparatus shown in FIG. 1 as taken along the plane 4—4;

FIG. 5 is a perspective view of a portion of the apparatus of FIG. 1;

FIG. 6 is a perspective view of an alternative version of a portion of the apparatus shown in FIG. 5;

FIG. 7 is a perspective, exploded view of another alternative version of a portion of the apparatus shown in FIG. 5;

FIG. 8 is a fragmented, side elevation view, in section, of a portion of a display apparatus according to the present invention incorporating an alternative drive system;

FIG. 9 is a fragmentary perspective view of a portion of the alternative cylinder drive means shown in FIG. 8;

FIG. 10 is a side sectional view of a spring biased, slidable coupling used in the drive system depicted in FIGS. 8 and 9;

FIG. 11 is a fragmented side elevation view, partially in section, showing an alternative cylinder mounting arrangement.

Detailed description

Figure 12:
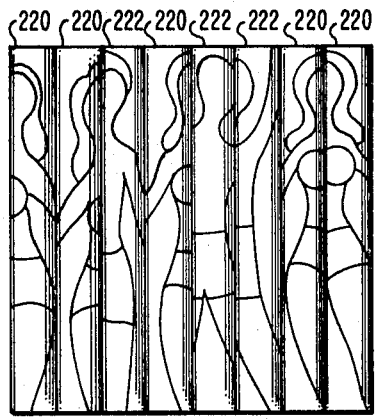
FIGS. 12–17 are front view, schematic representations of several basic configurations of the display apparatus of the present invention.

In FIGS. 1–4 of the drawings, an example of the display apparatus according to the invention is shown which includes an open frame 10 of wood, metal, or other suitable material, generally rectangular in shape and comprising an upper horizontal member 12, a lower horizontal member 14, and vertical side members 16. The lower frame member 14 has a generally U-shaped cross-section with upwardly extending side rails 18. The upper horizontal frame member 12 carries a plurality of equally spaced, upper spindle means which, in the example under discussion, includes a series of short, cylindrically shaped projections 20 suitably secured to the upper frame member 12 and extending downwardly therefrom into the interior of the frame 10.

Disposed within the open frame 10 is a plurality of rotatable, vertically oriented, parallel cylinders 22 arranged side by side with a clearance space 24 between adjacent cylinders. The space 24 is preferably made as small as possible, just permitting free, unimpeded rotation of the cylinders, that is, without contact or interference between outer surfaces of adjacent cylinders. Each cylinder has a central, vertical axis of rotation 25. Although the ensuing description will be directed chiefly to a display apparatus with vertically positioned cylinders, it will be understood that the cylinder orientation may be other than vertical, as for example, horizontal.

Although the cylinders 22 may be of solid construction, they are preferably fabricated to be as light as possible, thereby minimizing rotational inertia. Thus, as best shown in FIGS. 1–3, each cylinder 22 comprises a thin-walled, tubular body portion 26 constructed of any suitable material such as sheet metal, cardboard, plastic, fiber board, or the like. The desired design, illustration, pattern or form may be provided directly on the outer surface of the tubular body portion 26. The desired design, such as the figures 28 shown in FIG. 1, may be applied directly to the outer surface by painting or printing, for example. Alternatively, the outer surface of each cylinder 22 may be covered with a layer 30 of canvas, sheet metal, paper or other material which already bears the design or which receives the design, with oil paints or otherwise, after being affixed to the cylinder surface. Waterproof glue or other suitable adhesive may be used for attaching the outer layer 30 to the outer cylinder surface. The surfaces of the cylinders 22 or outer layers 30 may obviously be decorated with a great variety of materials to achieve many different effects. For example, besides ordinary paint, patterned fabrics such as carpeting may be utilized, as well as reflective metal sections, transparent and translucent plastics, "black light" and "day-glow" paints. Alternatively the cylinder surfaces may be sculptured, that is, provided with decorative projections or cutouts, the surfaces of adjacent cylinders being made to mesh, if desired.

Attached to the upper end of the tubular portion 26 of each cylinder 22 is a cap 32 with a centrally located aperture 34 and a ball or plane bearing 36 mounted within the aperture 34 for receiving the upper spindle 20. The lower end of the tube 26 is sealed off with a cap 38, likewise provided with a central aperture 40 and a ball or plane bearing 42 carried within the aperture. The cylinder described results in an exceedingly light, low inertia structure, easily rotated about the vertical central axis 25.

Mounted within the U-shaped lower frame member 14 and suitably secured thereto, is an elongated guide means which may conveniently take the form of a generally channel-shaped extruded member 50 including a base portion 52, upwardly extending sides 54 and inwardly directed flanges 56. Preferably, the channel member 50 extends substantially the full length of the lower horizontal frame member 14. The channel member 50 carries a plurality of lower spindle assemblies in the form of short, inverted channel members 60 provided with outwardly projecting ears 62 received underneath the inwardly projecting flanges 56 of the channel member 50. Secured to the upper portion of each inverted channel 60 and projecting vertically upward therefrom, is a lower spindle 64 which is received in the bearing 42 of the lower cap 38. Each lower spindle support channel 60 may be slidably positioned along the length of the channel 50 to bring the lower spindles 64 into vertical alignment with corresponding upper spindles 20. The lower spindle support 60 is then securely clamped by means of set screws 66, threaded into the ears 62, and tightened to make contact with the base 52 of the channel 50 to thereby force the ears 62 into engagement with the inwardly directed flanges 56. Each cylinder 22 may simply be supported by a thrust bearing 67 interposed between the lower cap 38 and the upper surface of the lower spindle support 60. Alternatively, as shown in FIGS. 1, 3, and 4, each cylinder 22 may rest on a light spring 68 interposed between the thrust bearing 67 under the cap 38 and the support 60. The spring 68 will be partially compressed by the weight of the cylinder to partially support the cylinder, so as to prevent binding and excessive wear which might otherwise occur between the cylinder and the spindles as a result of the eccentric load caused by the friction drive wheels 86.

The drive means for rotating the cylinders 22 with various velocities and in different directions of rotation, will now be described. Supported by one of the side members 16 of the frame 10 is a motor 76 having an output shaft 78 extending into the frame interior through a hole 80 formed in the side member 16. The motor size will, of course, be dictated by various factors including the size of the cylinders and the driving loads imposed; the specific drive motor required for a particular application will be apparent to those with ordinary skill in the art. Attached to the end of the motor shaft 78 is a shaft coupling 82 having secured at its other end a horizontally disposed, elongated line shaft 84 suitably journaled at its opposite end into the other side member 16. Mounted on the line shaft 84 is a plurality of small, friction drive wheels 86 keyed to the line shaft to be axially slidable along the shaft but rotatable therewith. This may be accomplished simply by forming the line shaft of stock having a polygonal cross-section, such as square, and providing the friction drive wheels 86 with matching polygonal central apertures for receiving the line shaft. Positioning of the friction drive wheels 86 along the length of the shaft 84 is accomplished by bifurcated brackets 90 straddling the wheels 86 and slidably received within the channel member 50. The line shaft 84 passes through bearings 91 which prevent sagging of the line shaft. The bifurcated brackets 90 are provided with ears 92 on either side (FIG. 5) which incorporate threaded fasteners 94 cooperating with the channel 50, as already described in connection with the inverted channels 60, to fix their position along the length of the channel member 50. It will be seen that driving of the cylinders 22 is accomplished by frictional contact between the drive wheels 86 and the lower planar surface of the cylinders. The distance separating the contact point between the drive wheel 86 and the lower cap 38 on the one hand, and the axis of rotation 25 on the other, determines the speed of rotation of the cylinders. This distance may be easily changed by loosening the threaded fasteners 94 and sliding the bracket 90 toward or away from the central axis 25 to achieve lesser or greater rotational speed. A scale 95, as shown in FIG. 5, is provided to indicate the separation distance.

FIGS. 1-3 show an example in which adjacent cylinders 22 rotate in opposite directions because adjacent friction wheels are located on opposite sides of the cylinder central axes. The relative directions of rotation, of course, can be chosen by placing each drive wheel assembly on the side of the cylinder rotational axis which will give the desired direction of rotation.

The combinations of cylinder surface designs, relative rotational velocities and directions are limited only by the imagination of the user and thus may be said to be virtually infinite. FIGS. 12-17 illustrate merely some basic configurations in schematic form which may be utilized to achieve a variety of optical effects. Each of the apparatus depicted in these figures has eight vertical cylinders, although, as already stated, virtually any number of parallel cylinders, oriented in any desired direction may be employed.

In FIG. 12, substantially identical patterns, in the form, for example, of female figures and male figures, are arranged on the surface cylinders 220 and 222, respectively. Adjacent cylinders are driven in opposite directions and, if desired, at different rotational speeds. The optical effect is one of dissociation and reunification of the figures in ever changing combinations.

Figure 13:
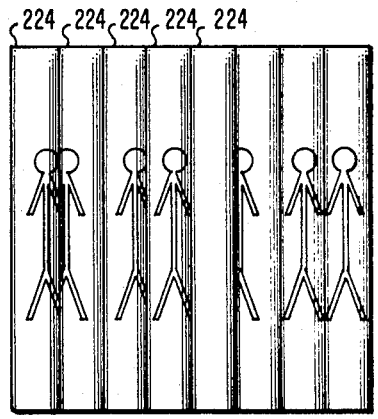

The surfaces of cylinders 224 in FIG. 13 are provided with substantially identical patterns extending not more than halfway around the cylinder circumference. With adjacent cylinders being rotated in opposite directions, the images appear and disappear and arrange themselves into endless groupings.

Figure 14:
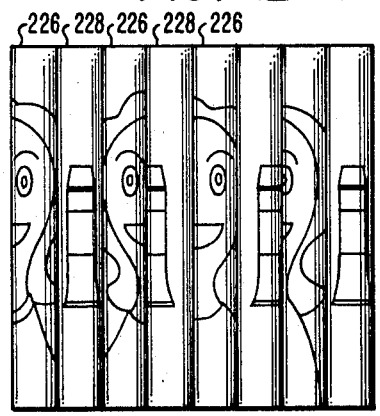

In FIG. 14, a first group of substantially identical patterns are provided on the surfaces of alternate cylinders and a second group of substantially identical patterns, unrelated to those of the first group, are arranged on the remaining, intervening cylinders. Thus, in FIG. 14, an example of an advertising display is depicted in which a woman's face is illustrated on the cylinders 226 with the product, in this case a lipstick, shows on the intermediate cylinder 228. The cylinders 226 are rotated at various speeds in one direction and the cylinders 228 turn, also at various speeds, in the other direction. An interplay between the two groups of illustrated objects is thereby produced in which one group will appear to move laterally behind the other.

Figure 15:
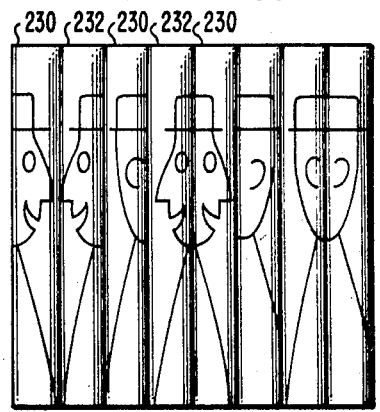

In FIG. 15, the mirror images are presented on adjacent cylinders 230 and 232 to provide a kaleidoscopic effect of ever changing variety when adjacent cylinders are rotated in opposite directions.

Figure 16:
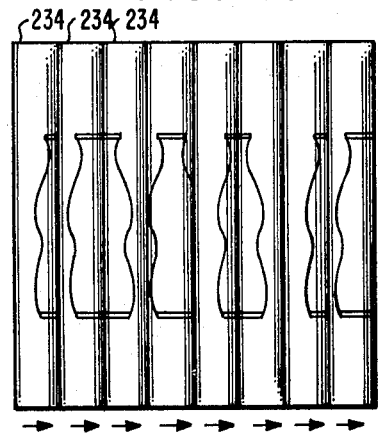

Referring to FIG. 16, when substantially identical patterns are formed on the surfaces of all of the cylinders 234 and the cylinders are all rotated in the same direction at greater velocities, say from left to right, an accelerating, lateral motion of the pattern toward the right is produced which gives the illusion of a never ending, "assembly line" type of movement.

Figure 17:
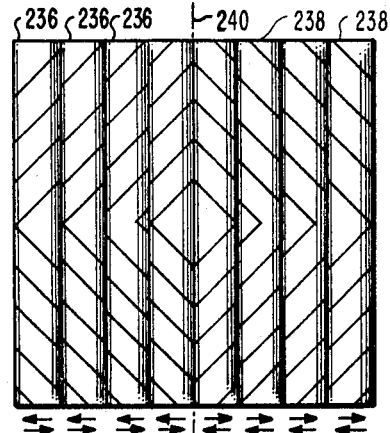

In FIG. 17, an exemplary form of a fine arts exhibit is shown in which a fragmentary portion of a concentric, symmetrical design is provided on each cylinder. The overall or composite design may, of course, take any form, whether square, circular, ellipsoidal, diamond-shaped, and so forth. In FIG. 17, for example, each cylinder 236 is provided with diagonal stripes being opposite in sense and symmetrical with diagonal stripes on the cylinders 238 lying on the other side of an axis of symmetry 240. By rotating the cylinders 236 in one direction and the cylinders 238 in the other, an attention-arresting optical effect of expansion (or contraction) of the design is produced.

FIGS. 6 and 7 illustrate alternative means for adjustably fixing the separation between the friction drive wheels 86 and the axis of rotation 25. In FIG. 6, a corrugated sheet metal strip 100 is secured at one end by a threaded fastener 102 to one of the ears 62 of the support 60. The ear 62 is provided with a small projection 104 to be engaged by one of the corrugations of the element 100. By loosening the threaded fastener 102, thereby disengaging the corrugated element 100 from the projection 106, the bifurcated bracket 90 may be longitudinally adjusted and set at a new position.

In FIG. 7, an elongated slotted element 110 is employed which is secured at one end by a threaded fastener 112 to one of the ears 62. Another threaded fastener 114 passes through the slot 111 of element 110 to be threadedly received by the ear 62. As will be evident from inspection of the drawings, by loosening the threaded fastener 114, the position of the bifurcated bracket 90 may be varied between the limits imposed by the extremities of the slot 111.

Turning now to FIGS. 8-10, an alternative form of the invention is shown in which the cylinder speeds, besides being different from one another, are continuously varied in accordance with a predetermined program. A frame 120 encloses a plurality of cylinders 122 journaled in the upper and lower portions of the frame in a manner already described in connection with FIGS. 1-5. A motor 124 is mounted near the lower end of one of the side members of the frame 120, its output shaft 126 extending into the frame interior. A circular line shaft 128, supported at one end by bearing means 129 carried by the other side member of the frame 120, is connected to be driven by the motor through an axially slidable coupling 130, details of which will be described in greater detail below in connection with FIG. 10. The line shaft 128 carries a plurality of friction drive wheels 132 whose positions along the shaft are preset and fixed by set screws 134 carried by the hubs of the wheels 132. Secured to the end of the line shaft 128 is a cylindrical cam element 136 having a profiled surface 138 riding in contact with roller means 140 suitably affixed to the frame 120. In operation, it will be seen that as the motor 124 rotates the line shaft 128 through the coupling 130, the line shaft 128 oscillates axially with a motion determined by the shape of the profiled surface 138 of the cam element 136. The coupling 130 serves to transmit rotational motion from the motor 124 to the line shaft 128 while permitting the shaft 128 to oscillate longitudinally. Referring now to FIG. 10, the coupling 128 consists basically of a tubular body 144 provided with a longitudinal through slot 146 positioned intermediate the ends of the body 144. The motor shaft 126 is received by one end of the tubular body and fixed into place by means of a set screw 148. Projecting into the other end of the tubular body 144 is the line shaft 128 which is provided with a cross pin 150 whose extremities ride within the slot 146. A spring 152, retained within the tubular body 144 and interposed between the motor shaft 126 and the line shaft 128, functions to bias the line shaft 128 away from the motor shaft 126 to maintain continuous contact between the profiled surface 138 of the cam 136 and the roller means 140. The relative cylinder motions obtained with the drive system shown in FIGS. 8–10 are extremely diverse and the repetition period of the display formed by the patterns on the cylinders is of extremely long duration. This repetition period can be extended even further by the insertion of a speed reducing transmission 154 (shown in phantom in FIG. 9), in the line shaft between the portion of the shaft supporting the friction wheels 132 and the cam element 136. The transmission means 154, suitably supported by the frame to enable it to move back and forth with the oscillations of the shaft 128, provides a speed reduction ratio causing the cam element 136 to rotate at a fraction of the velocity of the frictional wheels 132, the net result being a market increase in the repetition period.

It will be desirable, of course, to remove the cylinders for replacement with other cylinders having different designs for varying the presentation. This may be accomplished with apparatus exemplified in FIG. 11. A cylinder 160 is shown which comprises a central portion in the form of a tube 162 closed off at its upper and lower ends by caps 164 and 166, and projecting outwardly therefrom, are spindles 168 and 170, respectively, positioned concentrically of this axis of rotation of the cylinder and held in place by means of screw fasteners 172. The caps 164 and 166 have projecting annular flange portions 174 and 176, respectively, dimensioned to be frictionally received by the tube 162 and thereby held in place.

The cylinder 160 is mounted for rotation within a rectangular frame similar ot that already described and includes an upper horizontal member 178 and lower horizontal member 180, the latter supporting a longitudinal channel element 182 and spindle supporting means 184 held in place within the channel 182 in a manner already described. The upper frame member 178 is provided with a plurality of apertures 186 for receiving a downwardly extending sleeve 188 having an upper flange 190 for limiting the downward movement of the sleeve. An enclosure 192 is suitably secured to the upper frame member 178 in alignment with each hole 186 and contains a compression spring 194 bearing against the flange 190 for urging the sleeve 188 in a downward direction. The upper spindle 168 is slidably received by the sleeve 188 and the lower spindle 170 is rotatably journaled in an aperture 196 provided in the spindle support means 184 and oriented in vertical alignment with the upper frame aperture 186. A light spring 198 may be interposed between the lower planar surface of the lower cap 166 and the spindle support means 184 for carrying part of the weight of the cylinder 160 for reasons already mentioned. The remaining portion of the weight of the cylinder 160 is carried by the friction drive wheel 200 mounted on the line shaft 202.

To remove the cylinder 160, the tubular body is grasped and moved upwardly to bring the upper cap 164 into engagement with the sleeve 188. Further upward movement of the cylinder 160 together with the sleeve 188, compresses the spring 194, the lower spindle 170 eventually clearing the spindle support means 184. The lower end of the cylinder may then be moved out of the frame interior and the cylinder removed. Next, removal of the caps 164 and 166 facilitates substitution of the cylinder tube 162. After installation of the caps 164 and 166, the new cylinder may be inserted following the preceding steps in reverse.

While specific eramples of the invention have been shown and described. further modifications and improvements will occur to those skilled in the art. It is to be understood, therefore, that this invention is not limited to the particular forms shown. It is intended by the appended claims to cover all modifications which do not depart from the spirit and scope of the invention.

What is claimed is:

1. A dynamic display apparatus comprising:
frame means;
a plurality of rotatable cylinders mounted side by side within said frame means, the outer surface of each said cylinder having a pattern arranged thereon, each said cylinder further having a planar end surface; and
means operatively associated with said end surface of each said cylinder for rotatably driving said cylinder, said drive means being adjustable independently of the other cylinder drive means to permit control of the rotational velocity and direction of rotation of each cylinder.

2. Apparatus, as defined in claim 1, in which:
substantially identical patterns are provided on the outer surfaces of the cylinders, said drive means being set to rotate adjacent cylinders in opposite directions to produce the effect, during operation of the apparatus, of dissociation and reunification of the patterns in continuously varying combination.

3. Apparatus, as defined in claim 1, in which:
substantially identical patterns are provided on the outer surfaces of the cylinders, each pattern occupying no more than half of the circumference of the cylinder, said drive means being adjusted to rotate adjacent cylinders in opposite directions whereby the patterns appear and disappear and form continuously varying groupings during operation of the apparatus.

4. Apparatus, as defined in claim 1, in which:
a first group of substantially identical patterns is provided on the outer surfaces of alternate cylinders;
a second group of substantially identical patterns, different than the first group, is provided on the outer surfaces of the remaining cylinders, said drive means being adjusted to rotate adjacent cylinders in opposite directions whereby an interplay between the two groups of patterns is produced during rotation of the cylinders in which the patterns of one group appear to move laterally behind the patterns of the other group.

5. Apparatus, as defined in claim 1, in which:
substantially identical patterns are provided on the outer surfaces of the cylinders, said patterns being oppositely oriented on adjacent cylinders to provide a kaleidoscopic effect during operation of said apparatus with said drive means adjusted to rotate adjacent cylinders in opposite directions.

6. Apparatus, as defined in claim 1, in which:
substantially identical patterns are provided on the outer surfaces of the cyllinders, said drive means being set to rotate all of said cylinders in the same direction at varying rotational velocities to provide an effect of continuous lateral movement of said patterns.

7. Apparatus, as defined in claim 1, in which:
the outer surface of each cylinder is provided with a pattern, the combined effect of all the cylinder patterns being to produce a design symmetrical about an axis of the display apparatus, said cylinder drive means being adjusted to rotate cylinders on opposite sides of said axis in opposite directions.

8. In a changeable display apparatus comprising a plurality of cylinders mounted side by side for rotation within a frame means, the outer curved surface of each cylinder adapted to receive a design, each said cylinder having a planar end surface, means for driving the cylinders comprising:
   shaft means adapted to be rotationally driven by a motor means; and
   a plurality of cylinder drive wheels mounted along said shaft means, said wheels being adjustably positionable along the shaft means, each wheel being in frictional engagement with the planar end surface of one of the cylinders, the radial distance between the axis of rotation of the cylinder and the point of engagement of the drive wheel determining the velocity of rotation of the cylinder.

9. Apparatus, as defined in claim 8, which includes:
means operatively associated with the shaft means for axially oscillating said shaft means according to a predetermined program for varying the relative and absolute rotational velocities of the cylinders.

10. A dynamic display apparatus comprising:
   a frame including an upper horizontal member and a lower horizontal member;
   a plurality of upper, spaced spindle means, facing the frame interior, carried by the upper horizontal frame member;
   elongated, horizontally disposed guide means extending along and supported by the lower frame member;
   a plurality of lower spindle means, each in vertical alignment with a corresponding upper spindle means, disposed along the guide means;
   a plurality of vertically oriented cylinders disposed side by side with a small clearance between, the cylinders having upper and lower planar surfaces with bearing means for receiving the upper and lower planar surfaces with bearing means for receiving the upper and lower spindle means, each cylinder being thereby freely and independently rotatable about its central axis of rotation, the outer curved surface of each cylinder adapted to receive a design forming part of a continuously varying display during operation of the apparatus;
   a horizontal line shaft supported by the frame and adapted to be rotationally driven by a motor means and extending parallel to the guide means and oriented between the lower planar surfaces of the cylinders and the guide means;
   a plurality of friction drive wheels, keyed to the line shaft for rotation therewith but slidable along the shaft, the cylinders being gravity biased to bring the lower planar surface of each cylinder into frictional driving relation with one of the drive wheels; and
   means for adjustably fixing the position of the drive wheels along the shaft, the position fixing means being mounted on the guiding means and adjustably positionable therealong.

11. Apparatus, as defined in claim 10 in which:
the line shaft has a square cross-section; and
each drive wheel has a square central aperture for slidably receiving the line shaft to thereby prevent relative rotation between the line shaft and the wheel.

12. Apparatus, as defined in claim 10, in which:
the means for adjustably fixing the position of the drive wheels comprises a bifurcated bracket straddling each drive wheel and includes means for clamping the bracket to fix and drive wheel position relative to the central axis of rotation of the cylinder engaged by the wheel, the guide means including a scale for indicating the distance separating the drive wheel from the axis of rotation.

13. Apparatus, as defined in claim 12, in which:
the guide means comprises a channel-shaped element having a base attached to the lower frame member, upwardly directed sides, and inwardly directed flanges projecting from the upper extremities of the sides to form generally U-shaped edges; and
the bracket has opposed, projecting ears extending into the U-shaped edges and clamped into engagement with the inwardly directed flanges by screw fasteners threaded through the ears and into contact with the base of the channel.

14. A dynamic display apparatus comprising:
   a frame including an upper horizontal member, a lower horizontal member and vertical side members;
   a plurality of upper spindle means carried by the upper horizontal member and facing the frame interior;
   a plurality of lower spindle means mounted along the lower frame member and facing the interior of the frame, corresponding upper and lower spindle means being in vertical alignment;
   a plurality of vertically oriented cylinders disposed side by side having upper and lower end surfaces with bearing means receiving the upper and lower spindle means, each cylinder being thereby freely and independently rotatable about its central axis of rotation, the outer curved surface arranged to receive a design forming part of a continuous varying display during operation of the apparatus;
   a horizontal line shaft journaled between the side members of the frame and adapted to be rotationally driven by motor means, the shaft being mounted for axial, oscillatory motion;
   a plurality of friction drive wheels mounted along the shaft for rotation and oscillation therewith, the cylinders being gravity biased to bring the lower end surface of each cylinder into frictional driving relation with one of the drive wheels;
   slide coupling means secured to one end of the line shaft for coupling the shaft to the motor means and for transmitting rotary motion to the shaft but permitting oscillation thereof;
   cam means secured to the other end of the shaft, the cam means having a profiled surface;
   roller means carried by the frame and riding in contact with the profiled cam surface whereby the shaft is axially oscillated according to a program determined by the cam profile to continuously vary, during rotation of the line shaft, the radial distances separating the points of contact between the drive wheels and the lower end surface of the cylinders on the one hand and the corresponding cylinder axes of rotation on the other hand and thereby continuously vary the absolute and relative speeds of rotation of the cylinders; and
   means operatively associated with the cam means for biasing the profiled surface of the cam means into contact with the roller means.

15. Apparatus as defined in claim 14, in which:
the line shaft drives the cam means through a speed reducing transmission whereby the cam means rotates at a lower angular velocity than the line shaft.

References Cited

UNITED STATES PATENTS

| | | | |
|---|---|---|---|
| 1,374,921 | 4/1921 | Houston | 40—106.51 |
| 1,396,553 | 11/1921 | Bovy | 281—14 X |
| 1,711,790 | 5/1929 | Johnson | 40—33 |
| 2,214,410 | 9/1940 | Evans | 40—33 |
| 3,205,593 | 9/1965 | Busey | 35—46 |

LAWRENCE CHARLES, Primary Examiner

UNITED STATES PATENT OFFICE
CERTIFICATE OF CORRECTION

Patent No. 3,475,845                                      November 4, 1969

Charles Estvan, Jr.

It is certified that error appears in the above identified patent and that said Letters Patent are hereby corrected as shown below:

Column 1, line 11, strike out the comma, first occurrence, and insert instead -- is disclosed --. Column 2, lines 65 to 68, cancel "According to another aspect of the invention, a cylinder spindle mounting means is utilized making possible the removal and replacement of individual cylinders without disturbance of the drive mechanism.". Column 4, line 15, after "Alternatively" insert a comma; line 21, for "plane" read -- plain --; line 25, "plane" should read -- plain --; line 51, after "into" insert -- clamping --. Column 7, line 24, "market" should read -- marked --. Column 9, lines 33 and 34, after "lower" strike out "planar surfaces with bearing means for receiving the upper and lower"; line 64, "and" should read -- the --. Column 10, line 25, "continuous" should read -- continuously --.

Signed and sealed this 2nd day of June 1970.

(SEAL)
Attest:

EDWARD M. FLETCHER, JR.                        WILLIAM E. SCHUYLER, JR.
Attesting Officer                                      Commissioner of Patents